United States Patent
Ellerd

[15] 3,666,130
[45] May 30, 1972

[54] POWER DRIVEN ARTICULATED CONTAINER TRANSPORTING DEVICE

[72] Inventor: Charles J. Ellerd, 105 Panorama Drive, Bakersfield, Calif. 93305

[22] Filed: Dec. 3, 1970

[21] Appl. No.: 94,738

Related U.S. Application Data

[63] Continuation-in-part of Ser. No. 815,875, Apr. 14, 1969, Pat. No. 3,550,802.

[52] U.S. Cl. ............................214/621, 280/408, 280/442, 214/512
[51] Int. Cl. .........................................................B65f 3/08
[58] Field of Search ..................214/512, 515, 621; 280/408, 280/442

[56] References Cited

UNITED STATES PATENTS

| | | |
|---|---|---|
| 3,199,696 | 8/1965 | Chrysler et al...........................214/512 |
| 3,135,401 | 6/1964 | Schramm................................214/512 |
| 3,480,295 | 11/1969 | Duerksen..............................280/432 |
| 3,294,418 | 12/1966 | Middlesworth et al. ...............280/408 |

*Primary Examiner*—Gerald M. Forlenza
*Assistant Examiner*—Lawrence J. Oresky
*Attorney*—William C. Babcock

[57] ABSTRACT

A first power driven vehicle having a pivoted wheel supported extension situated rearwardly therefrom, and the extension capable of having a wheel supported second vehicle pivotally connected thereto. The first vehicle, extension, and second vehicle have a number of power operated, vertically movable pairs of forks extending outwardly therefrom. Each pair of forks is capable of removably engaging a loaded container and raising the latter to a position where it may be transported to a desired destination.

The first vehicle and extension are so operatively associated that when the first vehicle negotiates a curve the wheels of the extension are automatically pivoted to the extent that they track with the wheels of the first vehicle. Due to this automatic tracking, the first vehicle, extension, and second vehicle may be easily maneuvered in confined areas and on narrow roadways.

10 Claims, 9 Drawing Figures

INVENTOR.
CHARLES J. ELLERD
BY
William G. Babcock
ATTORNEY

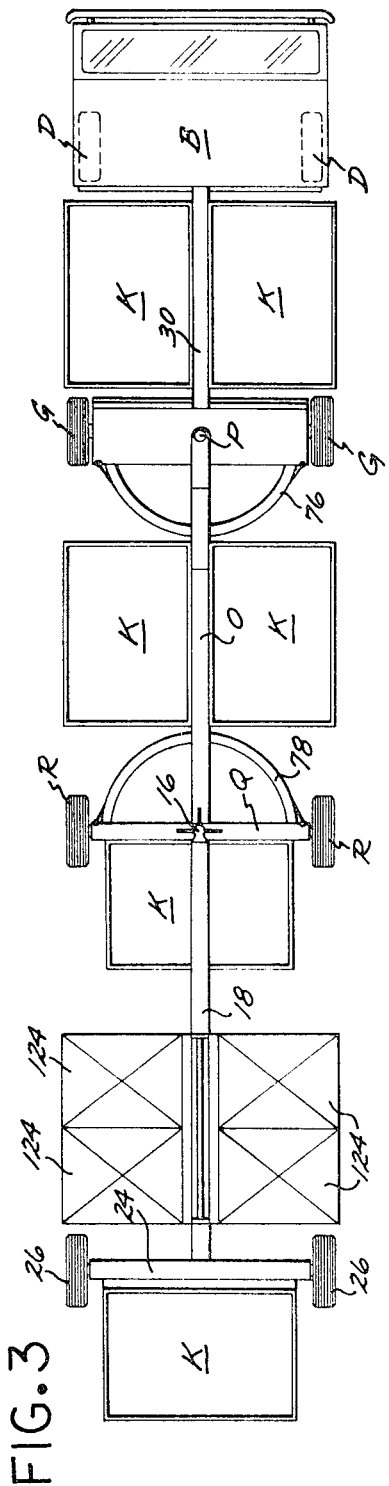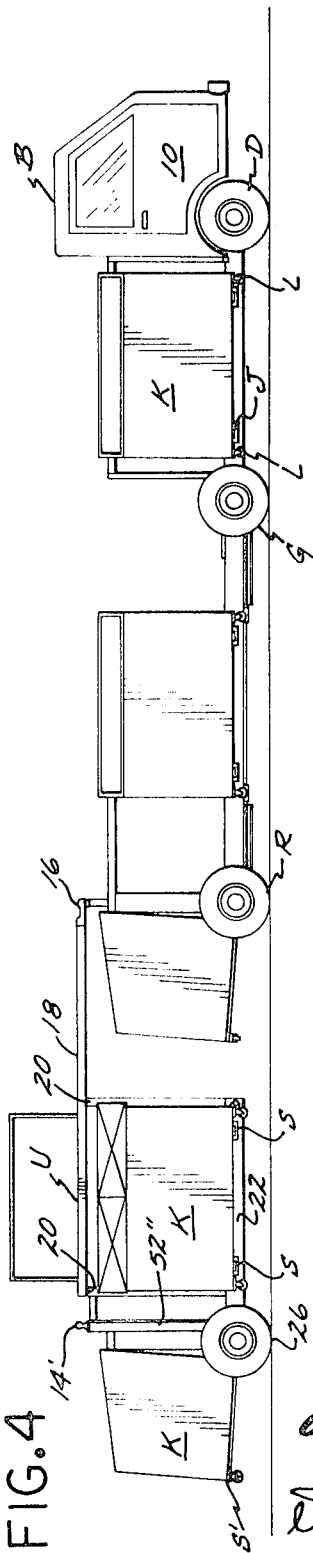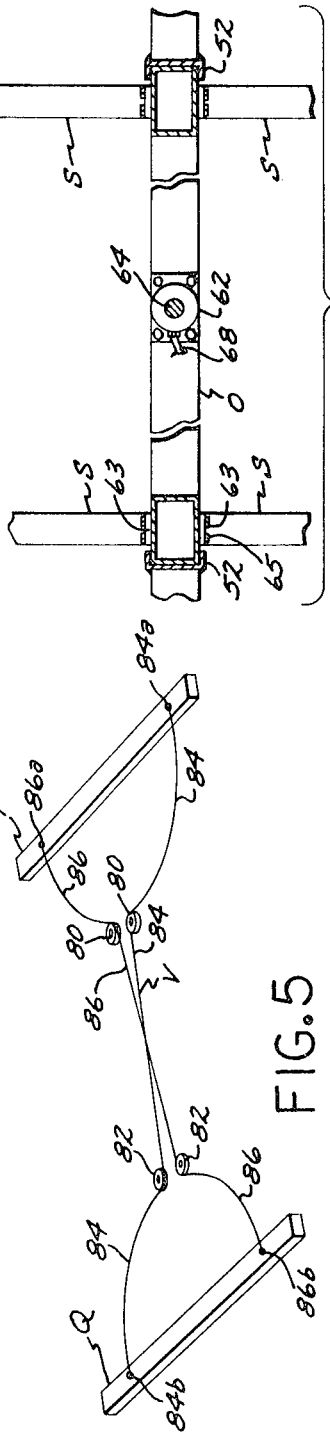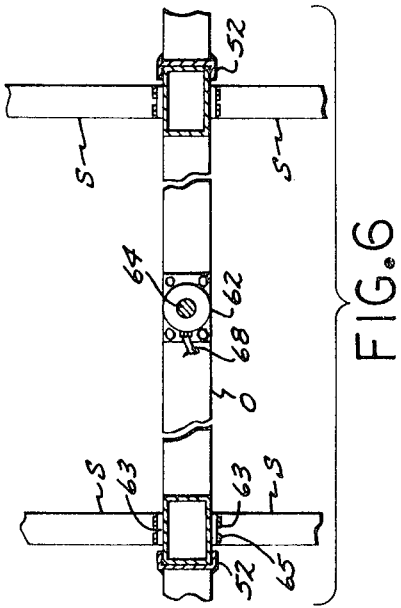

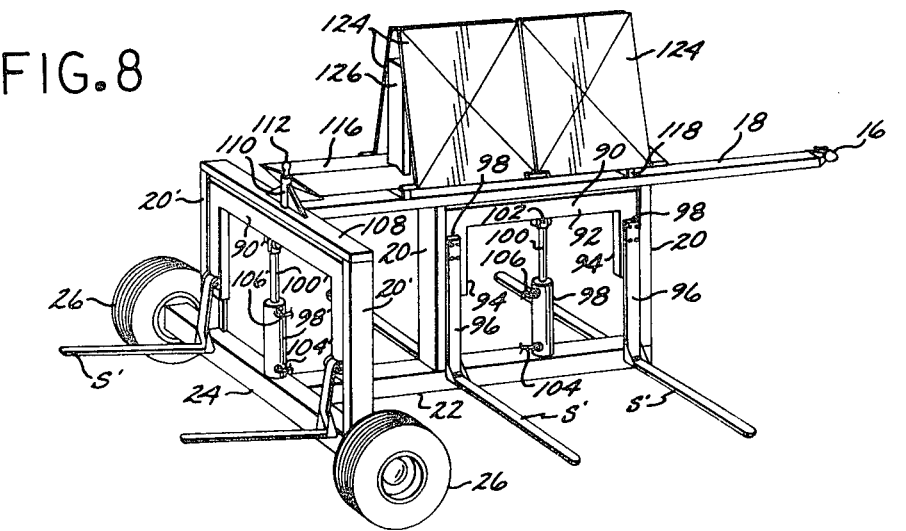
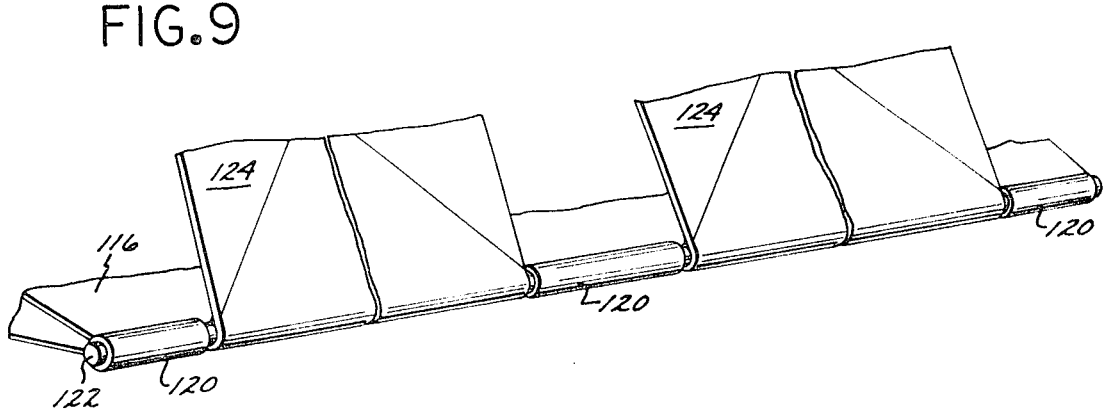
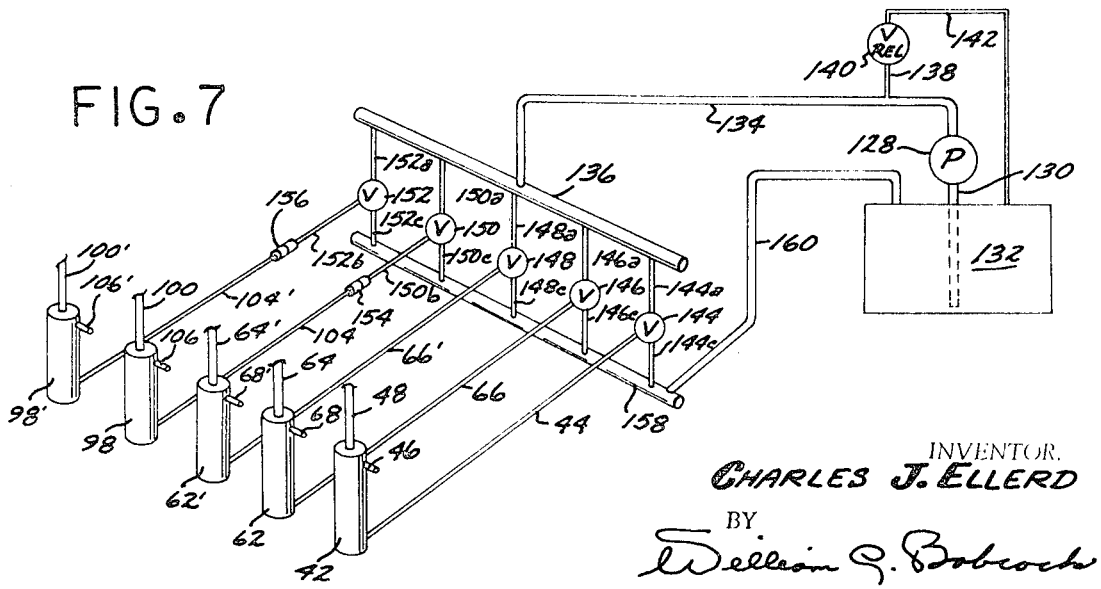
INVENTOR.
CHARLES J. ELLERD
BY
William G. Babcock
ATTORNEY

POWER DRIVEN ARTICULATED CONTAINER TRANSPORTING DEVICE

CROSS REFERENCES TO RELATED APPLICATIONS

The present application is a continuation-in-part of my application Ser. No. 815,875 entitled Power Driven Container Transporting Device filed on Apr. 14, 1969, now U.S. Pat. No. 3,550,802.

BACKGROUND OF THE INVENTION

1. Field of the Invention

A device for sequentially picking up a number of containers and thereafter transporting the same to a desired location where they may be disengaged from the device to rest on the ground surface.

2. Description of the Prior Art

In the collection of trash and refuse from residences and business establishments, it is the present-day practice to use expensive trucks for this purpose. After a truck has been loaded, it must be driven to a dump into which the collected refuse is deposited. Such a dump may be many miles from the source of collection, and valuable time is lost in making the trip to and from the dump. To compensate for such time loss, a number of expensive trucks are required, but by use of the present invention only one truck would suffice if the trash or refuse could be collected at a central location, and permit collection of trash and refuse to continue while the truck was traveling to, and returning from the dump.

The present invention substantially overcomes the operational difficulties above described by providing a power operated vehicle that may be used as such for the sequential collection of a number of containers, or with one or more vehicles arranged in end to end sequence, and each of which vehicles is adapted to engage and removably support a number of containers thereon for transportation purposes. When the invention is being used for the collection of trash in either business or residential districts, the filled containers may be left at a desired location and empty containers then mounted on the device. The truck carrying the trash and refuse to the dump receives the same at the desired location. Thus, the present invention permits substantially continuous gathering of trash and refuse, as lengthy trips to a dump or central trash depositing area are eliminated. Also, the present invention permits initial sorting of the trash at the site of pickup if desired.

SUMMARY OF THE INVENTION

A first vehicle that includes a chassis that has first steerable power operated wheels on the forward portion thereof, a transverse cross member secured to the rearward end of said chassis, which cross member supports a pair of second pneumatic-tired wheels. The chassis supports pairs of forks on opposite sides thereof that are vertically movable, and may engage containers to so support the latter that they may be transported to a desired location.

A drawbar is pivotally connected to substantially the center of the cross member. The rearward end of the drawbar is pivotally connected to a transverse cross piece that supports two third pneumatic-tired wheels on opposite ends thereof. The drawbar and third wheels cooperate to provide a rearward extension of the first vehicle. A number of pairs of power operated vertically movable forks are situated on opposite sides of the drawbar and are capable of engaging containers to permit the transportation of the latter to a desired destination. If desired, a pair of vertically movable forks may be provided on the rearward portion of the cross piece to support containers for transportation purposes thereon. The cross piece and cross bar are so operatively connected that as the first vehicle moves forwardly and pivots relative to the drawbar, the cross piece and third wheels pivot as a unit to track with the first and second wheels, and thus permit the maneuvering of the vehicle along a narrow road, around sharp corners, or in a confined space.

A second two-wheeled vehicle is provided that by ball and socket means is connected to the rearward portion of the drawbar, and the second vehicle being provided with a number of power operated vertically movable pairs of forks that removably engage containers to permit the containers to be transported to a desired destination.

A major object of the present invention is to provide a self-contained power operated vehicle having a plurality of vertically movable pairs of forks thereon that may sequentially engage containers, to permit the containers to be transported to a desired destination.

Another object of the invention is to provide a power operated vehicle that is adapted to have any desired number of two-wheeled trailer-like vehicles connected in sequence therewith, with each of the trailer-like vehicles having a number of vertically movable power operated forks associated therewith that may engage containers, and raise the latter to positions where they may be transported to a desired location.

A further object of the invention is to supply a sequence of power drawn vehicles of relatively simple inexpensive structure that are particularly useful in sequentially picking up containers at spaced positions, and transporting the latter in elevated positions to a desired location where they are lowered to the ground and disengaged from the vehicles.

A still further object of the invention is to furnish a sequence of power drawn container supporting vehicles that are particularly useful in the collection of trash and refuse, and permits such collection to be carried out in a rapid and economical manner.

BRIEF DESCRIPTION OF THE DRAWINGS

FIG. 3 is the same plan view as shown in FIG. 2, but with a trailer-like two-wheeled vehicle being connected to the first vehicle, and the trailer-like vehicle capable of transporting a number of containers to a desired location;

FIG. 4 is a side elevational view of the device shown in FIG. 3;

FIG. 5 is a diagrammatic view of the mechanism that pivots the third pair of wheels in the first vehicle to track with the first and second pairs of wheels as the first vehicle moves forwardly and negotiates a curve or turn;

FIG. 6 is a fragmentary horizontal cross sectional view of a portion of the device taken on the line 6—6 of FIG. 1;

FIG. 7 is a diagramatic view of a hydraulic system that may be used on the container transporting vehicles;

FIG. 8 is a perspective view of the second vehicle; and

FIG. 9 is an enlarged perspective view of the container covers that are pivotally supported from the second vehicle.

DESCRIPTION OF THE PREFERRED EMBODIMENTS

Figures 1, 2:
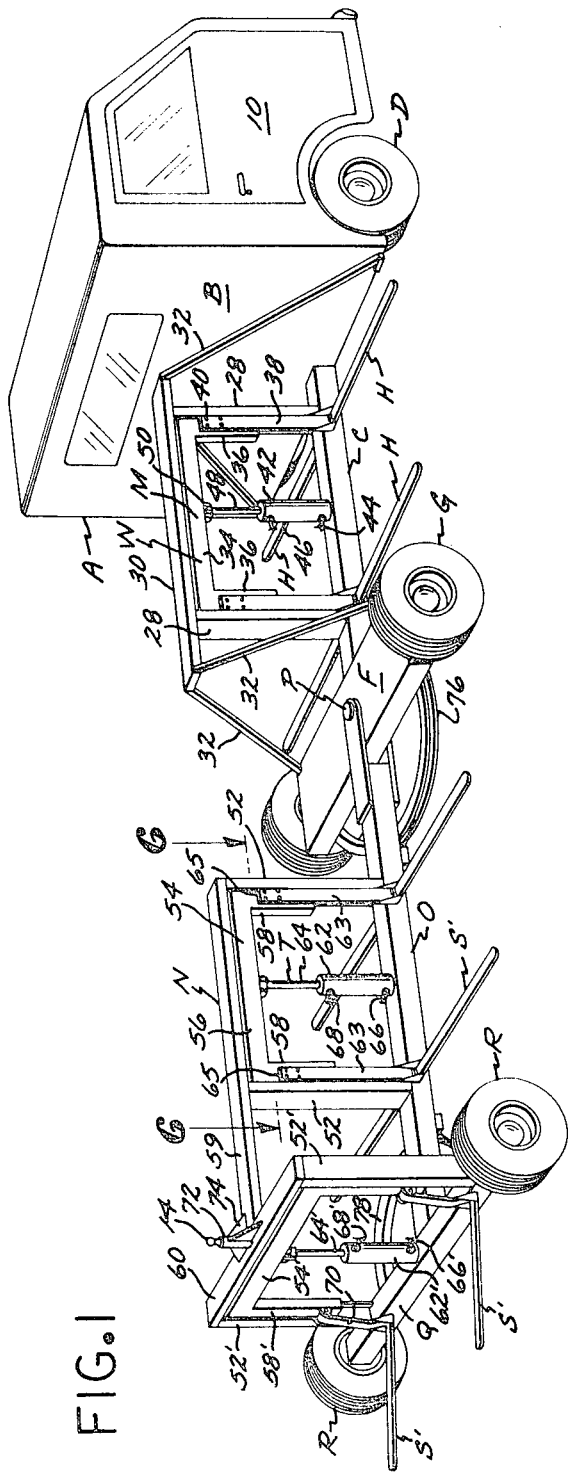
FIG. 1 is a perspective view of the self-contained power operated vehicle for collecting and transporting containers to a desired destination.
FIG. 2 is a top plan view of the device.

A first container transporting vehicle A is shown in perspective in FIG. 1, and preferably includes a cab B that is situated on the forward end of an elongate chassis C. The first vehicle A is provided with a pair of pneumatic-tired first wheels D that are steered by conventional steering means (not shown) and the power to the wheels being supplied through a conventional front wheel drive transmission E. Power to the transmission E is supplied from an engine Z that is preferably located adjacent the cab B.

The first vehicle A includes a container carrying wheel supported rearward extension N as may best be seen in FIGS. 1 and 2 that includes a drawbar O that is pivotally connected to the cross member F thereof and the cross member rotatably supporting a pair of second pneumatic-tired wheels G from opposite ends thereof. Pairs of first forks H extend outwardly from opposite sides of the chassis C, and are adapted to removably engage transverse guides J mounted on the bottom of containers K, when the containers are resting on casters or rollers L that extend downwardly from the bottom of the container and rest on the ground surface.

The pairs of forks H are adapted to be moved vertically relative to the chassis C by power means M shown in FIG. 1. When the containers K have been engaged by the forks H, the forks lift the containers on the first vehicle A to a position where the casters L are not in contact with the ground surface, and the containers can then be moved by the first vehicle A to a desired destination. At the desired destination, the power means M are actuated to lower the forks H and containers K engaged thereby to the extent that the casters L are in contact with the ground surface, with the containers then being moved transversely relative to the first vehicle A, and to the extent that they are disengaged from the forks H.

The first vehicle A includes a container carrying wheel supported rearward extension N as may best be seen in FIGS. 1 and 2 that includes a drawbar O that is pivotally connected to the cross member F by pin means P. The drawbar O has a transverse cross piece Q pivotally connected to the rearward end thereof by a downwardly extending pin or connection 12 as shown in FIG. 2. The cross piece Q rotatably supports a third pair of pneumatic-tired wheels R as may be seen in FIG. 1.

A number of pairs of second forks S extend outwardly in opposite directions from opposite sides of the drawbar O, and if desired, a pair of forks S may be disposed rearwardly of the cross piece Q to support a container K as shown in FIG. 2. The forks S are adapted to be moved vertically by power operated means T that, if desired, may be of the same structure as the power operated means M. A ball 14 is rigidly supported at an elevated fixed position on the rearward portion of the extension N, and is adapted to removably engage a socket 16 mounted on the forward end of a second drawbar 18 that forms a part of a second vehicle U. The drawbar 18 has a pair of longitudinally spaced members 20 depending therefrom, which members on their lower ends are secured to a longitudinally extending chassis member 22. The rearward end of the member 22 is secured to a transverse cross bar 24 that rotatably supports a fourth pair of pneumatic-tired wheels 26 from opposite ends thereof.

In the first vehicle A a mechanism V best seen in FIG. 5 is operatively associated with the cross member F and cross piece O to automatically pivot the third wheels R as the chassis C turns relative to the drawbar O, and to the extent that the third wheels R automatically track with the second wheels G. This automatic tracking of the third wheels R permits the first vehicle A and extension N to negotiate narrow roadways and confined areas which is a highly desirable characteristic in the picking up of trash containing containers.

The power means M as can best be seen in FIG. 1 includes two channel-shaped, longitudinally spaced, vertically extending guides 28 that are connected on their upper ends by a longitudinally extending member 30. The member 30 has reinforcing bars 32 extending downwardly and outwardly from the ends thereof as shown in FIG. 1, and the lower end of these bars being rigidly secured to the cab B and cross member F. The two guides 28 have an inverted C-shaped yoke W slidably mounted therebetween. The yoke W is of relatively heavy structure and is defined by a horizontal longitudinal member 34 that has two legs 36 depending from the ends thereof, and these legs being slidably disposed within the channel-shaped members 28. Each of the forks H has a vertically extending end piece 38 secured thereto. Each end piece 38 is affixed to one of the arms 36 by fastening means 40 such as bolts, rivets, welding or the like. A vertically positioned hydraulic cylinder 42 is mounted on an upper surface of the chassis C and is provided with fluid connections 44 and 46. The hydraulic cylinder 42 has a piston (not shown) slidably mounted within the interior thereof. The piston is connected to a piston rod 48 that extends upwardly from the cylinder 42 and is secured to the longitudinal member 34 by conventional means 50.

When fluid from a source (not shown) is discharged under pressure into the lower portion of the cylinder 42 through the conduit 44, it will be seen that the piston rod 48, yoke W, and the forwardly disposed pairs of forks H are moved upwardly. This upward movement of the forks H permits containers K that are in engagement therewith to be raised to positions where they may be transported to a desired destination on the first vehicle A.

The power operated means T on the rearward extension N include two vertical, longitudinally spaced, guides, 52 of transverse channel-shaped cross section that have their lower ends secured to an upper surface of the drawbar O. An inverted C-shaped yoke 54 is slidably mounted within the guides 52. The yoke 54 includes a longitudinal member 56 that has two legs 58 depending from the ends thereof. The upper ends of the guides 52 are secured to a horizontal longitudinally extending member 59 which on its rearward end is connected to a transverse cross member 60. The cross member 60 is supported by two transversely spaced guides 52' that extend downwardly from the ends thereof. The lower ends of the guides 52' are secured by welding or the like to the cross piece O as shown in FIG. 1.

Second hydraulic cylinder 62 is supported in a vertically extending position on an upper surface of the drawbar O. The hydraulic cylinder 62 has a piston (not shown) that is slidably mounted therein, with the piston being connected to a piston rod 64 that extends upwardly from the cylinder 62 and is secured to the yoke 54 at substantially the center of the member 56. Fluid may be discharged in and out of the hydraulic cylinder 62 through conduits 66 and 68 that are in communication with the lower and upper interior end portions of the cylinder. When hydraulic fluid is discharged into the cylinder 62 through the conduit 66, the pairs of forks S that extend outwardly from the drawbar O and normal thereto are raised to permit containers K that are in engagement with the forks to be raised to positions where they may be transported to a desired destination on the extension O. The forks S each have inner upwardly extending members 63 that are secured to the legs 58 by bolts 65 or the like.

The guides 52' serve to support a transversely positioned yoke 54' therebetween, and the yoke supporting a pair of forks S in a rearwardly extending position, with each of the forks S including an upwardly extending portion 70 that is secured to one of the legs 58' of the yoke 54'.

The yoke 54' and the rearwardly extending pair of forks S, best seen in FIG. 1, are moved upwardly and downwardly by a piston rod 64' that is operatively associated with a hydraulic cylinder 62' that is mounted at substantially the center of the cross piece Q. Hydraulic fluid may be discharged into the lower and upper interior portions of the hydraulic cylinder 62' through conduits 66' and 68'. The cross piece 60 as may best be seen in FIG. 1 has a short column 72 mounted at substantially the center thereof, which column supports the ball 14. Reinforcing webs 74 extend between the columns 72 and the member 58 and cross piece 60.

The cross member F and the cross piece Q have two semicircular curved cable guides 76 and 78 that extend towards one another and are preferably located under the drawbar O. The drawbar O supports two pairs of longitudinally spaced pulleys 80 and 82 as shown in FIG. 5. Two cables 84 and 86 are provided as may best be seen in FIG. 5, that have the ends 84a and 86a rigidly connected to the cross member F by conventional means and the ends 84b and 86b secured to the cross piece Q. The cables 84 and 86 as may be seen in FIGS. 1 and 5 have portions thereof situated within the guides 76 and 78, and the cables also engaging the pulleys 80 and 82.

In FIG. 5 it will be seen that the cables 84 and 86 cross over one another between the pulleys 80 and 82. When the first vehicle A negotiates a curve, the cross member F pivots relative to the drawbar O, and in so doing the cables 84 and 86 are moved, with this movement of the cables resulting in the crosspiece Q pivoting in a direction opposite to that in which the cross member F pivots, and to the extent that the third wheels R are caused to track with the second wheels G. The pivoting mechanism V shown in both FIGS. 1 and 5 is of the same type that was used for substantially the same purpose in my copending application No. 815,875.

The second vehicle U is shown in detail in FIG. 8. The longitudinally spaced, vertically extending members 20 are preferably of transverse channel-shaped cross section, and serve as vertical guides for an inverted U-shaped yoke 90 that includes a longitudinally extending portion 92 from which two legs 94 depend. The third forks S' include upwardly extending portions 96 that are secured by bolts 98 or other fastening means to the legs 94.

A fourth hydraulic cylinder 98 is mounted on the chassis member 22 as shown in FIG. 8, and has a piston rod 100 extending upwardly therefrom. The upper end of the piston rod 100 is connected to the portion 92 of yoke 90 by conventional fastening means 102. The cylinder 98 has a tubular member 104 that is in communication with the lower interior portion thereof. The upper interior portion of the hydraulic cylinder 98 has a tubular member 106 in communication therewith, which vents the upper interior portion of the cylinder to the atmosphere.

The weight of the yoke 90 and forks S' are so sufficient that they at all times tend to move piston rod 100 downwardly due to gravity, and in so doing, will discharge any fluid in the hydraulic cylinder 98 below the piston (now shown) outwardly through the tubular member 104, unless such flow of fluid through the tubular member is blocked by valve means later to be described.

The crossbar 24 as may be seen in FIG. 8 has two transversely spaced, vertical members 20' extending upwardly therefrom, that on their upper ends are connected by a second crossbar 108 that is transversely aligned with the first crossbar 24. The first crossbar 24 has a hydraulic cylinder 98' mounted thereon from which a piston rod 100' extends upwardly to engage a yoke 90' of the same structure as the yoke 90. The cylinder 98' has a tubular member 104 connected to the lower interior portion thereof, and the upper part of the cylinder above the piston (not shown) therein being vented to the atmosphere through a tubular member 106'.

The yoke 90' supports a pair of the third forks S' that extend rearwardly from the second vehicle U and may removably engage and support a container K as illustrated in FIGS. 3 and 4. The second crossbar 108 as may be seen in FIG. 8 supports a post 110 that has a ball 112 mounted on the upper portion thereof, which ball may removably engage a socket 16 of another second vehicle U (not shown) to draw the latter if desired. A longitudinally extending member 116 is provided that extends forwardly from the post 110 and by means of blocks 118 is supported above the second drawbar 18. The longitudinal edges of the member 116 have a number of longitudinally spaced tubes 120 projecting outwardly therefrom, which tubes are engaged by an elongate rod 122 that serves to pivotally support a number of generally rectangular covers 124. The covers 124 when not in use extend upwardly and inwardly towards one another, and are supported in this position by resting against a vertically extending stop 126 that is secured to the member 116. When containers K are mounted on the third pairs of forks S' that extend outwardly from the longitudinal sides of the second vehicle U, the covers 124 may be pivoted downwardly to cover the upper open ends thereof. The covers 124 when containers K are in an elevated transporting position provide a tight fit and thus prevent loose papers and the like from blowing from the containers.

The vertical movement of the first, second and third pairs of forks H, S, and S' is preferably controlled from the cab B of the first vehicle A. The first vehicle A includes a pump 128 that is driven by the engine Z or other power means not shown, and this pump having a suction line 130 connected thereto that extends to a reservoir 132. The pump 128 has a discharge line 134 extending therefrom that terminates in a first manifold 136. The discharge line 134 is connected to a conduit 138 that extends to a pressure relief valve 140, and the discharge from this pressure relief valve being connected to the interior of the reservoir 132 by a conduit 142 as may be seen in FIG. 7. Due to the above described arrangement, pump 128 may operate continuously and supply fluid under a predetermined pressure to first manifold 136 for use as needed. First, second, third, fourth and fifth multiport, multiposition, manually operated valves 144, 146, 148, 150 and 152 are provided. The valves 144 to 152 have first ports thereof connected by conduits 144a to 152a to the first manifold 136 as shown in FIG. 7. Second ports of the valves is separated from the first vehicle extension 144 to 152 as shown in FIG. 7 are connected to the conduits 44, 66, 66', 150b and 152b. The conduits 150b and 152b and the conduits 104 and 104' have quick disconnect couplings 154 and 156 on the free ends thereof, which couplings permit separation of the conduits 150b from 104 and 152b from 104', when the second vehicle U IS SEPARATED FROM THE FIRST VEHICLE EXTENSION N.

Third ports of the valves 144 to 152 are connected by conduits 144c, 146c, 148c, 150c and 152c to a second manifold 158 which in turn is connected to a conduit 160 that extends to the reservoir 132 and is in communication with the interior thereof. Each of the valves 144 to 152 is of such structure that when the valves are in a first spring-loaded position, communication between the first, second and third ports thereof is blocked.

When one of the valves is moved to a second position by means (not shown), communication is established between the first conduit associated therewith, and the particular second conduit 44, 66, 66', and 150b or 152b associated therewith, to discharge hydraulic fluid under pressure to the lower interior portion of one of the hydraulic cylinders 42, 62, 62', 98 or 98'. Such fluid discharged to one of the cylinders causes the pairs of forks H, S or S' associated therewith to move upwardly to an elevated position, and raise a container K that is engaged with the pair of forks to an elevated position on the first vehicle A, vehicle extension N, or second vehicle U to permit the transportation of the containers.

When the first vehicle A, vehicle extension N and second vehicle U have reached a desired destination, the containers K carried thereon may be selectively lowered to contact the ground surface (not shown), by moving the valves 144, 146, 148, 150 and 152 to third positions, where fluid communication is established between the second and third ports thereof, and fluid may discharge from the cylinders 42, 62, 62', 98 and 98' back to the reservoir 132 as may easily be seen in FIG. 7.

The weights of the pairs of forks H, S and S' will by gravity exert a sufficient force on the piston rods 48, 64, 64', 100 and 100' as to effect such flow of hydraulic fluid back to the reservoir 132. The upper tubular connections 46, 68, 68', 106 and 106' are employed to vent the upper interior portions of the cylinders 42, 62, 62', 98 and 98' to the atmosphere as the pistons (not shown) therein are moved upwardly by hydraulic fluid. Likewise, the tubular members 46, 68, 68', 106 and 106' permit flow of air from the ambient atmosphere to the upper interior portion of the cylinders as the pistons (not shown) therein move downwardly and prevent a negative pressure being formed in the upper portions of the cylinders.

Although but one second vehicle U is shown in FIG. 3, it will be apparent that a succession of such vehicles may be pivotally connected end to end, due to the drawbar supported sockets 16 and the post supported balls 14.

The use and operation of the invention has previously been described in detail and need not be repeated.

I claim:

1. A power operated container carrying assembly in which each container includes transverse fork engageable means, said assembly comprising:

a. a first vehicle that includes a chassis, a pair of first steerable wheels and steering means therefor at the forward end of said chassis, a cross member at a rearward end of said chassis, a second pair of wheels rotatably supported in fixed relationship with said cross member, an engine, and a transmission for transferring power from said engine to at least one of said pair of wheels;

b. a first vehicle extension that includes an elongate first drawbar, first means for pivotally connecting a forward end of said drawbar to substantially the center of said cross member, a transverse cross piece pivotally connected to a rearward end of said drawbar, and a pair of third wheels rotatably supported in a fixed relationship with said cross piece;

c. second means for so pivoting said cross piece and third wheels relative to said drawbar when said chassis turns to an angular position relative to said drawbar that said third pair of wheels tracks with said pairs of first and second wheels as said first vehicle moves forwardly;

d. a plurality of pairs of first forks that extend outwardly from opposite sides of said chassis;

e. a plurality of pairs of second forks that extend outwardly from at least opposite sides of said drawbar; and f. third power operated means for selectively moving said first and second pairs of forks upwardly and downwardly relative to said chassis and drawbar to permit said containers when in engagement with said pairs of forks to be raised to elevated positions on said first vehicle and first vehicle extension where they may be transported to a desired destination thereon.

2. An assembly as defined in claim 1 which in addition includes a pair of second forks that extends rearwardly from said cross piece.

3. An assembly as defined in claim 1 in which said second means includes a plurality of cables in guided positions that extend between said cross piece and cross member.

4. An assembly as defined in claim 1 in which said second means comprises:

g. first and second semi-circular grooved guides that lie in substantially the same horizontal plane, extend towards one another, and said guides secured to said cross member and cross piece respectively;

h. a plurality of longitudinally spaced pairs of pulleys rotatably supported from said drawbar; and i. first and second crossed over taut cables that engage said pairs of pulleys and said guides, and with the ends of said cables affixed to said cross piece and cross member.

5. An assembly as defined in claim 1 in which said pairs of first and second forks have first and second upwardly projecting extensions, and said third power operated reams includes:

g. first and second hydraulic cylinders supported on said chassis and first drawbar and extending upwardly therefrom;

h. first and second piston rods that extend upwardly from said first and second cylinders;

i. first and second elongate rigid members connected to the upper ends of said first and second piston rods as well as to said first and second upwardly projecting extensions;

j. first and second pairs of guides that extend upwardly from said chassis and first drawbar that slidably engage said rigid members and maintain the latter in longitudinally extending positions relative to said chassis and first drawbar; and k. fourth means for selectively discharging hydraulic fluid under pressure into and out of the lower interior portions of said first and second hydraulic cylinders to raise and lower said first and second pairs of forks to permit said containers with which they are in engagement to be transported to a desired destination on said first vehicle and first vehicle extension.

6. An assembly as defined in claim 2 in which said pairs of first and second forks have first and second upwardly projecting extensions, and said third power operated means includes:

g. first, second and third hydraulic cylinders supported on said chassis, first drawbar and cross member respectively;

h. first, second and third piston rods that extend upwardly from said first, second and third cylinders;

i. first, second and third elongate rigid members connected to the upper ends of said first, second and third piston rods as well as to said first and second upwardly projecting extensions;

j. first, second and third pairs of guides that extend upwardly from said chassis, first drawbar and cross piece respectively, that slidably engage said rigid members to maintain said first and second rigid members in longitudinally extending positions relative to said chassis and first drawbar and said third member parallel to said cross piece; and k. fourth means for selectively discharging hydraulic fluid under pressure into and out of the lower interior portions of said first, second and third hydraulic cylinders to raise and lower said first and second pairs of forks to permit said containers with which they are in engagement to be transported to a desired destination on said first vehicle and first vehicle extension.

7. An assembly as defined in claim 5 in which said fourth means is mounted on either said first vehicle or vehicle extension and includes:

l. a hydraulic fluid reservoir;

m. a hydraulic pump having a suction and discharge, with said suction connected to said reservoir;

n. fifth power means for driving said pump;

o. first and second multi-position valves that normally occupy first positions where fluid cannot discharge therethrough;

p. a pressure relief valve;

q. first conduit means connecting first ports of said first and second valves and said pressure relief valve to said discharge of said pump;

r. second conduit means connecting second ports of said first and second valves to the lower interior portions of said first and second cylinders;

s. third conduit means connecting third ports of said first and second valves to said reservoir; and t. fourth conduit means connecting a second port of said relief valve to said reservoir through which fluid from said discharge is by-passed when said first and second cylinders are not being actuated, with either said first or second valve when moved to a second position establishing communication between said first and second ports thereof to discharge said fluid to said cylinder with which it is associated to raise either said first or second pairs of forks and said containers in engagement therewith, and either said first or second valve when moved to a third position to block communication between sad first and second ports and establish communication between said second and third ports to permit hydraulic fluid in said cylinder with which said valve is associated to discharge therefrom to said reservoir through said third conduit means and lower said first or second forks to permit containers in engagement therewith to be separated therefrom.

8. A power operated container carrying assembly in which each container includes transverse fork engageable means, said assembly comprising:

a. a first vehicle that includes a chassis, a pair of first steerable wheels and steering means therefor at the forward end of said chassis, a cross member at a rearward end of said chassis, a second pair of wheels rotatably supported in fixed relationship with said cross member, and engine, and a transmission for transferring power from said engine to at least one of said pair of wheels;

b. a first vehicle extension that includes an elongate first drawbar, first means for pivotally connecting a forward end of said drawbar to substantially the center of said cross member, a transverse cross piece pivotally connected to a rearward end of said drawbar, and a pair of third wheels rotatably supported in a fixed relationship with said cross piece:

c. second means for so pivoting said cross piece and third wheels relative to said drawbar when said chassis turns to an angular position relative to said drawbar that said third pair of wheels tracks with said pairs of first and second wheels as said first vehicle moves forwardly;

d. a plurality of pairs of first forks that extend outwardly from opposite sides of said chassis;

e. a plurality of pairs of second forks that extend outwardly from at least opposite sides of said drawbar;

f. a second vehicle that includes an elevated forwardly extending second drawbar, a longitudinally extending chassis member under said second drawbar, a first transverse crossbar connected to the rearward end of said chassis member, a pair of fourth wheels that occupy a fixed relationship with said first crossbar, a second transverse crossbar connected to the rearward end of said second drawbar, first and second pairs of vertical guide members that extend between said second drawbar and said chassis member, and between said first and second crossbars;

g. a plurality of pairs of third forks that project outwardly from opposite sides of said chassis member and rearwardly from said first crossbar;

h. third means that are power operated for selectively moving said first, second and third pairs of forks upwardly and downwardly relative to said chassis, drawbar and chassis member to permit said containers when in engagement with said pairs of forks to be raised to elevated positions on said first vehicle, vehicle extension and second vehicle where they may be transported to a desired destination thereon; and i. fourth means for removably connecting a forward end of said second drawbar to a rearward portion of said vehicle extension.

9. An assembly as defined in claim 8 in which said second means includes a plurality of cables in guided positions that extend between said cross piece and cross member.

10. An assembly as defined in claim 8 in which said second means comprises:

j. first and second semi-circular grooved guides that lie in substantially the same horizontal plane, extend towards one another, and said guides secured to said cross member and cross piece respectively;

k. a plurality of longitudinally spaced pairs of pulleys rotatably supported from said drawbar; and l. first and second crossed over taut cables that engage said pairs of pulleys and said guides, and with the ends of said cables affixed to said cross piece and crossbar.

* * * * *